(12) United States Patent
Jeong et al.

(10) Patent No.: US 7,432,015 B2
(45) Date of Patent: Oct. 7, 2008

(54) NEGATIVE ACTIVE MATERIAL FOR A RECHARGEABLE LITHIUM BATTERY, A METHOD OF PREPARING THE SAME, AND A RECHARGEABLE LITHIUM BATTERY COMPRISING THE SAME

(75) Inventors: Goo-Jin Jeong, Suwon-si (KR); Sang-Min Lee, Suwon-si (KR); Sung-Soo Kim, Suwon-si (KR); Yoshiaki Nitta, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 630 days.

(21) Appl. No.: 11/065,888

(22) Filed: Feb. 24, 2005

(65) Prior Publication Data

US 2005/0186475 A1    Aug. 25, 2005

(30) Foreign Application Priority Data

Feb. 25, 2004 (KR) ............... 10-2004-0012773
Feb. 25, 2004 (KR) ............... 10-2004-0012774

(51) Int. Cl.
*H01M 4/58* (2006.01)

(52) U.S. Cl. ............. 429/231.8; 429/218.1; 429/231.6; 252/182.1; 423/331; 423/325; 423/324; 423/445 R; 423/448; 423/449.1; 423/579; 423/592.1; 423/594.16; 423/635

(58) Field of Classification Search ............. 429/231.8, 429/218.1, 231.6; 252/182.1; 423/331, 325, 423/324, 445 R, 448, 449.1, 579, 592.1, 594.16, 423/635
See application file for complete search history.

(56) References Cited

U.S. PATENT DOCUMENTS 6,638,662 B2   10/2003   Kaneda et al.

FOREIGN PATENT DOCUMENTS

| CN | 1402366 A | 3/2003 |
|---|---|---|
| JP | 10-144316 A | 5/1998 |

*Primary Examiner*—Laura S Weiner
(74) *Attorney, Agent, or Firm*—Christie, Parker & Hale, LLP

(57) ABSTRACT

The negative active material for a rechargeable lithium battery of the present invention includes a carbonaceous material and a silicon-based compound represented by Formula 1:

$$Si_{(1-y)}M_yO_{1+x} \quad (1)$$

where $0<y<1$, $-0.5 \leq x \leq 0.5$, and M is selected from the group consisting of Mg, Ca, and mixtures thereof.

9 Claims, 1 Drawing Sheet

NEGATIVE ACTIVE MATERIAL FOR A RECHARGEABLE LITHIUM BATTERY, A METHOD OF PREPARING THE SAME, AND A RECHARGEABLE LITHIUM BATTERY COMPRISING THE SAME

CROSS REFERENCES TO RELATED APPLICATION

This application claims priority to and the benefit of Korean Patent Application Nos. 10-2004-0012773, and 10-2004-0012774, both filed on Feb. 25, 2004, and both of which are hereby incorporated by references for all purposes as if fully set forth herein.

FIELD OF THE INVENTION

The present invention relates to a negative active material for a rechargeable lithium battery, a method of preparing the same, and a rechargeable lithium battery comprising the same, and particularly, to a negative active material for a rechargeable lithium battery having good cycle-life characteristics and good charge and discharge characteristic at a high rate, a method of preparing the same, and a rechargeable lithium battery comprising the same.

BACKGROUND OF THE INVENTION

The use of portable electronic instruments is increasing as electronic equipment gets smaller and lighter due to developments in the high-tech electronic industries. Studies on rechargeable lithium batteries are actively being pursued in accordance with an increased need for batteries having high energy density for use as power sources in these portable electronic instruments. Even though graphite is suggested for the negative active material as it has a theoretical capacity of 372 mAh/g, a material with a higher capacity than graphite is desired.

Silicon or silicone compounds have been proposed as a substitute for graphite. The silicon or silicone compounds are known to be alloyed with lithium and have a higher electric capacity than graphite.

Recently, the following have been proposed for substitution with the conventional graphite material: (a) a simple mixture of a graphite and a silicone compound powder, (b) a material in which a pulverized silicone compound is chemically fixed on the surface of graphite by a silane coupling agent, and (c) a material in which an element such as Si is bound with or coated on the graphite-based carbonaceous material.

However, regarding (a) a simple mixture of graphite and silicone compound powder, the graphite is not completely contacted with the silicone compound so that the silicone compound is released from the graphite when the graphite is expanded or contracted upon repeating the charge and discharge cycles. Therefore, as the silicone compound has low electro-conductivity, the silicone compound is insufficiently utilized for a negative active material and the cycle characteristics of the rechargeable lithium battery deteriorate.

Regarding (b) a material in which a pulverized silicone compound is chemically fixed on the surface of graphite by a silane coupling agent, although the resulting material works as a negative active material, at the early charge and discharge cycles, problems arise in that the silicone compound expands when it is alloyed with the lithium upon repeating the charge and discharge cycles. Therefore, the linkage of the silane coupling agent is broken to release the silicone compound from the graphite so that the silicone compound is insufficiently utilized as a negative active material. As a result, the cycle characteristics of the rechargeable lithium battery deteriorate. Further, the silane coupling agent may not be uniformly treated upon preparing the negative electrode material so that it is difficult to provide a negative electrode material having a constant quality.

Regarding (c) a material in which an element such as Si is bound with or coated on the graphite-based carbonaceous material, such a material has similar problems as those of (b) a material in which the pulverized silicone compound is chemically fixed on the surface of graphite by a silane coupling agent. That is, upon progressing through charge and discharge cycles, the linkage of the amorphous carbonaceous material can be broken by the expansion of the material alloyed with the lithium. The material is thereby released from the graphite carbonaceous material and is insufficiently utilized as a negative active material. As a result, the cycle characteristics deteriorate.

SUMMARY OF THE INVENTION

In embodiments of the present invention, a negative active material is provided for a rechargeable lithium battery having improved cycle-life characteristics and charge and discharge characteristic at a high rate, as well as a method of preparing the same.

In another embodiment of the present invention, a rechargeable lithium battery is provided comprising the negative active material.

In one embodiment of the present invention, a negative active material is provided for a rechargeable lithium battery which comprises a carbonaceous material and a silicone-based compound represented by the following Formula 1:

$$Si_{(1-y)}M_yO_{1+x} \qquad (1)$$

where $0<y<1$, $-0.5 \leq x \leq 0.5$ (mol fraction), and M is selected from the group consisting of Mg, Ca, and mixtures thereof.

A method of preparing the negative active material for a rechargeable lithium battery is also provided, the method comprising the steps of: mixing $SiO_2$, Si, and an M-included compound (where M is selected from the group consisting of Mg, Ca, and mixtures thereof) to provide a mixture; heating the mixture to provide a silicone-based compound represented by the following Formula 1:

$$Si_{(1-y)}M_yO_{1+x} \qquad (1)$$

where $0<y<1$, $-0.5 \leq x \leq 0.5$ (mol fraction), and M is selected from the group consisting of Mg, Ca, and mixtures thereof; quenching the heated silicone-based compound; and mixing the quenched silicone-based compound and a carbonaceous material.

In another embodiment of the present invention, a rechargeable lithium battery is provided comprising a negative electrode comprising the negative active material described above; a positive electrode comprising a positive active material capable of reversibly intercalating/deintercalating the lithium; and an electrolyte.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawing, wherein.

DETAILED DESCRIPTION

Figure 1:
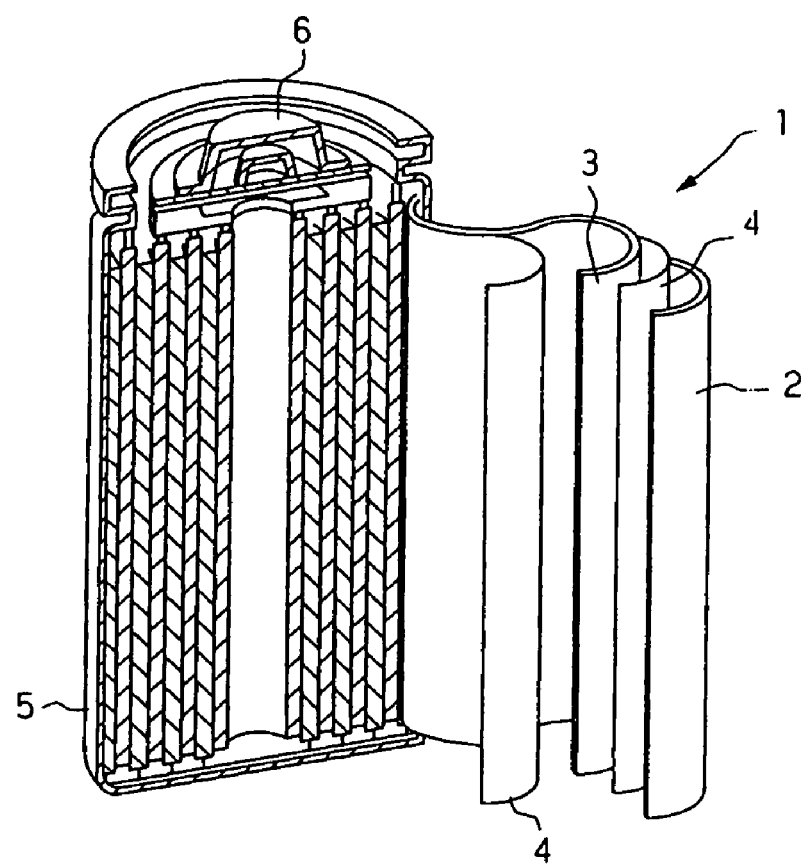
FIG. 1 is a perspective view showing one embodiment of a rechargeable lithium battery according to the present invention.

In the following detailed description, certain preferred embodiments of the invention have been shown and described, simply by way of illustration of the best mode contemplated by the inventors of carrying out the invention. As will be realized, the invention is capable of modification in various obvious respects, all without departing from the scope of the invention. Accordingly, the drawings and description are to be regarded as illustrative in nature, and not restrictive.

The negative active material according to an embodiment of the present invention comprises a carbonaceous material and a silicon-based compound represented by the following Formula 1:

$$Si_{(1-y)}M_yO_{1+x} \quad (1)$$

where $0<y<1$, $-0.5 \leq x \leq 0.5$ (mol fraction), and M is selected from the group consisting of Mg, Ca, or mixtures thereof.

In Formula 1, y is preferably between 0 and 1, and more preferably between 0 and 0.5. Furthermore, in Formula 1, x is preferably between −0.5 and 0.5, and more preferably between −0.2 and 0.2. When x is more than 0.5, the irreversible capacity may increase due to reactions with the lithium causing the early-stage efficiency to deteriorate.

Generally, the silicon oxide represented by Formula 2:

$$SiO_{1+z} \quad (2)$$

where $0 \leq z \leq 1$, is known to be unsuitable for the negative active material for a rechargeable lithium battery, because of its high irreversible capacity, short cycle life, and low charge and discharge efficiency at high rate. This is because it has a stable structure upon repeating the charge and discharge, and a low diffusion speed of Li atoms.

As the present invention employs the silicon-based compound represented by Formula 1 for a negative active material by introducing Mg, Ca, or a mixture thereof into a silicon oxide compound of Formula 2, it is possible to increase the amorphorization degree of the negative active material, to prevent the Si-metal aggregate from growing when the negative active material is reduced, and to improve the diffusion speed of Li atoms.

According to a first embodiment of the present invention, a negative active material of a complex of a silicon-based compound and a carbonaceous material includes a core of a silicon-based compound represented by Formula 1 which is obtained by introducing Mg, Ca, or a mixture thereof into a silicon oxide compound of Formula 2, with a carbonaceous material coated on the surface of the core.

According to a second embodiment of the present invention, a negative active material includes a mixture of a carbonaceous material and a silicon-based compound represented by Formula 1 which is obtained by introducing Mg, Ca, or a mixture thereof into a silicon oxide compound of Formula 2.

The amorphorization degree of the negative active material according to the present invention is 70% or more, and preferably between 70 and 99%. Furthermore, the diffusion speed of Li atoms of the negative active material is $10^{-8}$ cm$^2$/sec or more, and preferably between $10^{-8}$ and $10^{-6}$ cm$^2$/sec determined according to GITT (Galvanostatic Intermittent Titration Technique). The amorphorization degree is defined by the following Calculation Formula: Amorphorization degree (%)=((Main XRD peak intensity of silicon-based compound after carrying out quenching treatment)/((Main XRD peak intensity of silicon-based compound before carrying out quenching treatment))×100.

The carbonaceous material coated or mixed with the silicon-based compound may include crystalline carbon or amorphous carbon. The crystalline carbon may include a sheet-, a spherical-, or a fiber-shaped natural graphite or artificial graphite. The amorphous carbon may be any one of graphitizable carbon (soft carbon, sintered carbon at a low temperature), and non-graphitizable carbon (hard carbon). The soft carbon can be obtained by heating a coal pitch, a petroleum pitch, a tar, or a heavy oil having a low molecular weight at 1000° C. The hard carbon can be obtained by heating a phenol resin, a naphthalene resin, a polyvinyl alcohol resin, a urethane resin, a polyimide resin, a furan resin, a cellulose resin, an epoxy resin, or a polystyrene resin at 1000° C. Further, it can be obtained by optional non-deliquescence of a mesophase pitch, raw coke, and a carbonaceous material in which the petroleum, the coal-based carbonaceous material, or the resin-based carbon is heated at between 300 and 600° C., and heating the same at between 600 and 1500° C.

The silicon-based compound and the carbonaceous material are preferably mixed in a weight ratio of between 95:5 and 50:50, more preferably between 95:5 and 70:30, and still more preferably between 80:20 and 60:40.

Hereinafter, a method of preparing a silicon-based compound composing the negative active material according to one embodiment of the present invention is described. An M-included compound (wherein M is Mg, Ca, or a mixture thereof) is added to a mixture of SiO$_2$ and Si, and the mixture is heated. SiO$_2$ and Si are preferably mixed in a molar ratio of between 1:1 and 1:3.

The M-included compound (where M is Mg, Ca, or a mixture thereof) is preferably a glass network precursor. Suitable Mg-included compounds include MgO, and suitable Ca-included compounds include CaO. These compounds are preferably added at 20 parts to 50 parts by weight based on 100 parts by weight of a mixture of SiO$_2$ and Si.

The heating temperature is preferably between 600 and 1000° C., and more preferably between 800 and 1000° C. When the heating temperature is less than 600° C., it is difficult to provide a uniform silicon-based compound due to the deteriorated heat diffusion. Further, when it is more than 1000° C., an undesirable decomposition reaction of Si may occur. The heating process is preferably carried out under an inert atmosphere or a vacuum atmosphere. According to the invention, Mg, Ca, or both are introduced onto the silicon-based compound to improve the diffusion speed of the lithium and the amorphorization degree of the negative active material.

After the heating process, the compound is quenched to form glass. The quenching process may include, but is not limited to, water-cooling or melt-spinning methods. In the melt-spinning method, the melted material is sprayed via a fine nozzle by gas having a specific pressure to a metal roll (typically, a Cu-roll) rotating at a high speed and having a surface temperature at room temperature or less. The quenching speed is preferably between $10^2$ and $10^7$ K/sec.

The silicon-based compound including Mg, Ca, or both is provided by the heating and the quenching processes. Then the resulting silicon-based compound is coated or mixed with a carbonaceous material to provide a negative active material. These two methods are referred to as the "coating" or "mixing" methods, respectively.

The silicon-based compound and the carbonaceous material are preferably used in a weight ratio of between 95:5 and 50:50, more preferably between 95:5 and 70:30, and still more preferably between 80:20 and 60:40.

The carbonaceous material may be crystalline carbon or amorphous carbon.

For crystalline carbon, the negative active material made by the coating method can be obtained by mixing the core material and crystalline carbon in either a solid phase or a liquid phase, and subsequently coating the crystalline carbon on the core. For the mixing method, the negative active material can be obtained by mixing the core material and crystalline carbon in either a solid phase or a liquid phase.

For a solid-phase mixing method, the mixing step may be performed by mechanically mixing the core material with crystalline carbon. Mechanical mixing may be accomplished by kneading, or using a mixer having a mixing blade with a modified wing structure compared a conventional mixing blade so as to provide sufficient shear stress to the mixture. Alternatively, a mechano-chemical mixing technique may be used where shear strength is applied to particles in order to cause fusion between particle surfaces.

For a liquid-phase mixing method, the mixing step may be performed either by mechanically mixing the core material with crystalline carbon, or by spray-drying, spray-pyrolysis, or freeze-drying. Possible solvents include water, organic solvents, or mixtures thereof. Possible organic solvents include ethanol, isopropyl alcohol, toluene, benzene, hexane, tetrahydrofuran, and the like.

For amorphous carbon, the carbon material can be formed by heat-treating the mixture of a core material coated with the carbon material precursor. The coating process may be performed using a dry or wet method. Additionally a deposition method such as chemical vapor deposition (CVD) may be performed using a carbon-included gas such as methane, ethane or propane. For the carbon material precursor used for coating the carbonaceous material over the core, at least one material selected from the group consisting of various resins such as phenolic resin, naphthalene resin, polyvinylalcohol resin, urethane resin, polyimide resin, furan resin, cellulose resin, epoxy resin, and polystyrene resin; coal-based pitch; petroleum-based pitch; tar; or heavy oil with a low molecular weight may be used. However, it is understood that the carbon material precursor in the present invention is not limited thereto.

A rechargeable lithium battery according to one embodiment of the present invention comprises a negative electrode composed of the negative active material described above. The negative electrode is prepared by mixing the negative active material with a conductive agent and a binder to provide a negative electrode mass, and coating the same on a current collector of copper.

The conductive agent may include, but is not limited to, nickel powder, cobalt oxide, titanium oxide, or carbon. The carbon for the conductive agent may include ketchen black, acetylene black, furnace black, graphite, carbon fiber, or fullerene, and is preferably graphite.

FIG. 1 shows a rechargeable lithium battery 1 according to an embodiment of the present invention. The rechargeable lithium battery 1 includes a negative electrode 2, a positive electrode 3, and a separator 4 interposed between the positive electrode 3 and the negative electrode 2, all of which are placed in a cell housing 5 filled with electrolyte and sealed with a sealing member 6. Even though the rechargeable lithium battery shown in FIG. 1 is formed in a cylindrical shape, it may be formed into various shapes such as a prismatic, a coin, or a sheet shape.

The positive electrode may be constructed of a positive electrode mass comprising a positive active material, a conductive agent, and a binder. Suitable positive active materials include compounds capable of reversibly intercalating/deintercalating lithium ions such as $LiMn_2O_4$, $LiCoO_2$, $LiNiO_2$, $LiFeO_2$, $V_2O_5$, TiS, or MoS. Suitable materials for the separator include olefin-based porous films such as polyethylene or polypropylene.

Suitable electrolytes include lithium salts dissolved in a solvent. Suitable lithium salts include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_aF_{2a+1}SO_2)(C_bF_{2b+1}SO)$ (wherein a and b are natural numbers), LiCl, LiI, and mixtures thereof. Suitable solvents include ethylene carbonate, propylene carbonate, butylene carbonate, benzonitrile, acetonitrile, tetrahydrofurane, 2-methyl tetrahydrofurane, γ-butyrolactone, dioxolane, 4-methyldioxolane, N,N-dimethylformamide, dimethylacetoamide, dimethylsulfoxide, dioxane, 1,2-dimethoxyethane, sulforane, dichloroethane, chlorobenzene, nitrobenzene, dimethyl carbonate, methylethyl carbonate, diethyl carbonate, methylpropyl carbonate, methylisopropyl carbonate, ethylbutyl carbonate, dipropyl carbonate, diisopropyl carbonate, dibutyl carbonate, diethylene glycol, dimethyl ether, and mixtures thereof.

Furthermore, instead of a liquid electrolyte as set forth above, a solid polymer electrolyte may be used. It is preferred that if a polymer electrolyte is used, it should employ a polymer having ion-conductivity to lithium ions, and examples include polyethylene oxide, polypropylene oxide, and polyethyleneimine. The electrolyte may also be in a gel state such that the solvent and the solute are added to the polymer.

The following examples further illustrate the present invention in detail, but are not to be construed to limit the scope thereof.

EXAMPLE 1

$SiO_2$ and Si were mixed in a molar ratio of 1:1 to provide a mixture. To the mixture, 9 parts by weight of MgO based on 100 parts by weight of the mixture were added, mixed, then heated at 900° C. under a vacuum and quenched at a rate of $10^7$ K/sec by a melt spinning technique to provide $Si_{0.9}Mg_{0.1}O$. The resulting $Si_{0.9}Mg_{0.1}O$ was mixed with graphite at a weight ratio of 1:1 to provide a negative active material.

EXAMPLE 2

$SiO_2$ and Si were mixed in a molar ratio of 1:1 to provide a mixture. To the mixture, 12 parts by weight of CaO based on 100 parts by weight of the mixture were added, mixed, then heated at 900° C. under a vacuum and quenched at a rate of $10^7$ K/sec by a melt spinning technique to provide $Si_{0.9}Ca_{0.1}O$. The resulting $Si_{0.9}Ca_{0.1}O$ was mixed with graphite at a weight ratio of 1:1 to provide a negative active material.

COMPARATIVE EXAMPLE 1

$SiO_2$ and Si were mixed at a molar ratio of 1:1 and heated at 900° C. under a vacuum and quenched at a rate of $10^7$ K/sec to provide SiO. The resulting SiO and graphite were mixed at a weight ratio of 1:1 to provide a negative active material.

EXAMPLE 3

$SiO_2$ and Si were mixed in a molar ratio of 1:1 to provide a mixture. To the mixture, 9 parts by weight of MgO based on 100 parts by weight of the mixture were added, mixed, then heated at 900° C. under a vacuum and quenched at a rate of $10^7$ K/sec to provide $Si_{0.9}Mg_{0.1}O$. The resulting $Si_{0.9}Mg_{0.1}O$ was coated with 30% by weight of amorphous carbon material using chemical vapor deposition (CVD) to provide a negative active material.

COMPARATIVE EXAMPLE 2

A Si powder having a particle size of 5 μm was coated with 30% by weight of amorphous carbon material using chemical vapor deposition (CVD) to provide a Si-complex negative active material coated with carbon material.

COMPARATIVE EXAMPLE 3

$SiO_2$ and Si were mixed in a molar ratio of 1:1, then heated at 900° C. under a vacuum and quenched at a rate of $10^7$ K/sec to provide SiO. The resulting SiO was coated with 30% by weight of amorphous carbon material using chemical vapor deposition (CVD) to provide a negative active material.

Fabricating a Test Cell for Measuring the Charge and Discharge

The negative active materials according to Examples 1 to 3 and Comparative Examples 1 to 3 were mixed with polyfluorovinylidene in a ratio of 90:10 in N-methylpyrrolidone to provide a negative electrode slurry solution. The slurry solution was applied with a doctor blade to a copper foil having a thickness of 18 μm, and heated under a vacuum atmosphere at 100° C. for 24 hours to evaporate the N-pyrrolidone. A negative active mass having a thickness of 120 μm was thereby deposited on the cupper foil, which was then cut to form a circle with a diameter of 13 mm to thereby provide a negative electrode.

In addition to the negative electrode, lithium metal foil was punched in a circle shape having the same diameter as the negative electrode to provide a counter electrode, and a separator composed of a porous polypropylene film was inserted between the negative electrode and the counter electrode to provide a coin-type test cell. For the electrolyte, 1 mol/L of $LiPF_6$ solution was dissolved in a mixed solvent of propylene carbonate (PC), diethyl carbonate (DEC), and ethylene carbonate (EC) at a volume ratio of PC: DEC: EC of 1:1:1.

The charge and discharge tests were performed for the negative active materials according to Examples 1 and 2 and Comparative Example 1 under the condition of a 0.2 C charge and discharge rate, a cut-off charge voltage of 0 V ($Li/Li^+$), and cut-off discharge voltage of 2.0 V ($Li/Li^+$), and the results are summarized in Table 1.

In the following Table 1, initial irreversible capacity was measured using galvanostatic charge/discharge tester. The capacity at 2C was measured using galvanostatic charge/discharge test, and cycle life retention ratio was measured after 100 cycle charging and discharging at 0.2C. The diffusion rate of the lithium (Li) was measured according to GITT (Galvanostatic Intermittent Titration Technique).

TABLE 1

| | Early Stage Irreversible Capacity (%) | Ratio (%) of Capacity at 2C Relative to that at 0.2C | Cycle Life Retention Ratio (%) after 100 Charge and Discharge Cycles | Diffusion Rate of Li ($cm^2$/sec) |
|---|---|---|---|---|
| Example 1 | 90 | 80 | 70 | $2.1 \times 10^{-8}$ |
| Example 2 | 90 | 80 | 70 | $2.2 \times 10^{-8}$ |
| Comparative Example 1 | 65 | 50 | 30 | $1 \times 10^{-10}$ |

As shown in Table 1, the rechargeable lithium battery comprising negative active materials according to Examples 1 and 2 have improved early stage irreversible capacity at 25% higher, the capacity at 2C relative to 0.2C at 30% higher, and the cycle-life retention rate at 40% higher, than the rechargeable lithium battery comprising the negative active material according to Comparative Example 1. Furthermore, the lithium was very rapidly diffused.

With respect to the negative active materials of Example 3 and Comparative Examples 2 and 3, discharge capacity, initial efficiency, and cycle life and amorphization degree of the active materials were measured. The amorphization degree is defined by the following Calculation Formula 1: Amorphization degree (%)=((Main XRD peak intensity of silicon-based compound after carrying out quenching treatment)/((Main XRD peak intensity of silicon-based compound before carrying out quenching treatment))×100.

The results are shown in Table 2.

TABLE 2

| | Discharge Capacity (mA/g) | Initial Efficiency (%) | Cycle Life After 100 Charge and Discharge Cycles (%) | Amorphorization Degree |
|---|---|---|---|---|
| Example 3 | 700 | 88 | >90 | 80 |
| Comparative Example 2 | 1200 | 90 | <40 | 0 |
| Comparative Example 3 | 850 | 78 | <70 | 50 |

As described in Table 2, the negative active material of Example 3 has higher amorphorization degree and improved cycle life characteristics compared to the negative active materials of Comparative Examples 2 and 3.

As described above, the negative active material for a rechargeable lithium battery according to the present invention is capable of increasing the amorphorization degree of the negative active material by introducing Mg, Ca, or a mixture thereof into a silicon-based mixture and accelerating the diffusion rate of Li atoms. Thereby, the cycle-life characteristics and the charge and discharge characteristics at high rate of the rechargeable lithium battery are improved.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A negative active material for a lithium secondary battery, comprising:
a carbonaceous material and a silicon-based compound represented by the following formula:

$$Si_{(1-y)}M_yO_{1+x}$$

where $0<y<1$, $-0.5 \leq x \leq 0.5$ and M is selected from the group consisting of Mg, Ca, and mixtures thereof.

2. The negative active material for a lithium secondary battery according to claim 1, wherein the negative active material has an amorphorization degree of 70% or more, and a diffusion rate of Li measured by GITT (Galvanostatic Intermittent Titration Technique) of $10^{-8}$ cm$^2$/sec or more.

3. The negative active material for a lithium secondary battery according to claim 1, wherein the negative active material has an amorphorization degree of between 70% and 99%, and a diffusion rate of Li measured by GITT (Galvanostatic Intermittent Titration Technique) of between $10^{-8}$ and $10^{-6}$ cm$^2$/sec.

4. The negative active material for a lithium secondary battery according to claim 1, wherein y is between 0 and 0.5, and x is between −0.2 and 0.2.

5. The negative active material for a lithium secondary battery according to claim 1, wherein the carbonaceous material is selected from crystalline carbon and amorphous carbon.

6. The negative active material for a lithium secondary battery according to claim 1, wherein the silicon-based compound and the carbonaceous material are mixed in a weight ratio of between 95:5 and 50:50.

7. The negative active material for a lithium secondary battery according to claim 1, wherein the carbonaceous material is coated on the surface of the silicon-based compound.

8. The negative active material for a lithium secondary battery according to claim 1, wherein the negative active material is a mixture of the silicon-based compound and the carbonaceous material.

9. A lithium secondary battery comprising:
a negative electrode comprising the negative active material according to claim 1;
a positive electrode comprising a positive active material capable of reversibly intercalating/deintercalating the lithium; and
an electrolyte.

* * * * *